United States Patent
Davis

(10) Patent No.: US 6,512,856 B1
(45) Date of Patent: Jan. 28, 2003

(54) SYSTEM AND METHOD FOR INFORMATION STAMPING A DIGITIZED IMAGE

(75) Inventor: Kenneth P Davis, Brighton, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/361,623

(22) Filed: Jul. 27, 1999

(51) Int. Cl.$^7$ .............................. G06K 9/36; H04N 7/167
(52) U.S. Cl. ....................... 382/284; 382/100; 382/162; 380/200
(58) Field of Search ................................ 382/100, 284, 382/274, 162, 312, 301; 380/243, 200, 216; 101/45; 348/239; 358/455; 345/593

(56) References Cited

U.S. PATENT DOCUMENTS

| | | | |
|---|---|---|---|
| 4,714,957 A | 12/1987 | Takano ........................ 382/100 |
| 4,860,039 A | 8/1989 | Hata et al. ................... 354/106 |
| 5,389,991 A | 2/1995 | Naka et al. .................. 354/159 |
| 5,521,721 A | * 5/1996 | Van Gennip ................. 358/455 |
| 5,601,018 A | 2/1997 | Iimura et al. .................. 101/45 |
| 5,884,108 A | 3/1999 | Kamo et al. ................. 396/315 |
| 5,901,224 A | * 5/1999 | Hecht ............................. 380/4 |
| 6,078,873 A | * 6/2000 | Shutty et al. .................. 702/89 |
| 6,222,932 B1 | * 4/2001 | Rao et al. .................... 382/100 |
| 6,275,260 B1 | * 8/2001 | Anderson .................... 348/239 |
| 6,362,829 B1 | * 3/2002 | Omvik et al. ................ 345/593 |

FOREIGN PATENT DOCUMENTS

| EP | 0561700 A1 | 9/1993 |
|---|---|---|
| WO | WO99/14941 | 3/1999 |

* cited by examiner

*Primary Examiner*—Bhavesh Mehta
*Assistant Examiner*—Kanji Patel
(74) *Attorney, Agent, or Firm*—Steven L. Webb

(57) ABSTRACT

A scanned image is stamped with additional information at a user settable location and color during the scanning process. The information can be the time and date that the scan occurred or information supplied by the user. The location can be at one of the predefined locations or at a location defined by the user. The information is not limited to text but can also contain bitmap image information.

6 Claims, 2 Drawing Sheets

SYSTEM AND METHOD FOR INFORMATION STAMPING A DIGITIZED IMAGE

FIELD OF THE INVENTION

This invention relates generally to scanners, copiers, facsimile machines, digital cameras and other devices used for transforming an optical image of a object into a electronic signal and more specifically to stamping additional information into the electronic image during the digitizing process.

BACKGROUND OF THE INVENTION

Scanning systems typically contain a host computer connected to a scanner. Scanners are devices that transform an optical image of a document into electronic form. Scanners typically have lenses and mirrors that focus an image of the page to be transformed onto a photo sensor array, a lamp to illuminate the page to be transformed, and a photo sensor array that coverts the image into an electronic signal. The photo sensor array is typically a charged-coupled device (CCD). The area of the page focused onto the CCD is usually referred to as the "scan line". The direction along the scan line is typically called the scan width or X-direction. The entire object is scanned by sweeping the illuminated scan line across the entire object, either by moving the object with respect to the illumination and optical assemblies, or by moving the illumination and optical assemblies relative to the object. The direction of relative movement is typically called the scan length or Y-direction. Scanners can create data at a different rate than can be sent to the host computer. To compensate for the differing data creation rate and data transfer rate scanners typically contain memory locations for the temporary storage of some of the scanned image data.

The electric signals created by the CCD are converted into digital form and stored as digital images. Digital images are typically divided into pixels, where each pixel represents a small area of the original image (typically 1/300 or 1/600 of an inch). For a color digital image each pixel typically has three numbers that represent the amount of red, green, and blue content of the image at that location. Each of the three numbers has a potential range of values. Typically the numbers can range in values between 0 and 255. In a computer it takes 8 bits to represent the range from 0 to 255. The total number of bits to represent all three colors is 24 bits (3×8). Therefore many digital images are stored in a 24-bit format.

Digital cameras create digital images by focusing the image of an object, through a lens, onto an area sensor array. The electronic signal from the area sensor array is then digitized and stored in memory as a digital image. Digital cameras typically contain sufficient memory to store a number of digital images. Digital images typically contain a header area and a data area. The header information contains data for the specific file type being used to store the image (Some example image file types are tiff, bmp, and JPEG). The data area of the file contains the color information for each pixel or sample in the image. The color information for images from digital cameras typically is represented in 24-bit format. The digital images can be transferred from the digital camera into a personal computer for storage or manipulation or can be transferred to a printer to create a hardcopy output of the digital images. Typically the data in the header part of an image file is not reproduced when viewing or printing the digital image.

Digital cameras typically have the capability to maintain the current date and time. Typically each digital image file header contains the time and date that the image was created. Some digital cameras have the ability to stamp or add the date and time information into the color data in the image file. Once the date and time information has been added or stamped into the color data information in the image file, the date and time information becomes part of the image and is visible whenever the image is displayed or printed. Typically the user can choose one of the corners of the digital image and the color of the text used to display the date and time information.

Problems can occur when the color of the date and time stamp is near the color of the image at the stamping location (for example a blue stamp in a blue sky). This makes it difficult or impossible to see the date and time stamp in the digital image. The current solution is for the user to select a different color for the stamp or move the stamp to a different location. This requires an extra step for the user.

Scanners typically do not track the current date and time. The date and time information currently can be added to the electronic image from a scanner in an image editor. Image editors are complex programs that many users are not comfortable using. Using an image editor is an extra step in addition to the scanning process.

The user may want to automatically stamp a digital image with information that is not limited to the date and time the image was created. There is a need to add or stamp digital images with additional information and automatically choose a color for the information that allows high contrast between the image and the stamped information.

SUMMARY OF THE INVENTION

A digital image is stamped with user definable information. The information can be textual information or a bitmap supplied by the user. The textual information is inserted using a color that is automatically selected for high contrast at the location of the stamp. The bitmap information replaces the digital information at the location of the stamp.

DETAILED DESCRIPTION OF THE PREFERRED EMBODIMENT

A digital imaging system that can be enabled to automatically stamp additional information onto a digital image during the image creation process can enhance the usability of the digital imaging system. The stamping information can be any auxiliary image or information that will be added to the electronic copy of the original image. The stamping information can be a company name or symbol, or it can be information used to track which imaging system was used to create the reproduction or it can be the name of the person creating the reproduction. The stamping information can be the date that the electronic image was created or a description of what the image contains (i.e. "this is mom and me at the Grand Canyon on her birthday"). The stamped information can be located at one of the predefined locations (for example one of the four-corners of the image) or the user can specify any location in the image. When the stamped information is text, the color of the text can be selected from a plurality of colors or a high contrast color can be used to maximize contrast between the added text and the original image. By incorporating the stamping process into the image creation process, information can be added to each image automatically without additional user intervention. For example a realtor that uses a digital camera to take photos of the houses that are for sale may want to add the company logo to each picture. Using an embodiment of this invention a bitmap of the company logo could be downloaded to the digital camera and would automatically be added to each photo that was taken.

Figure 1:
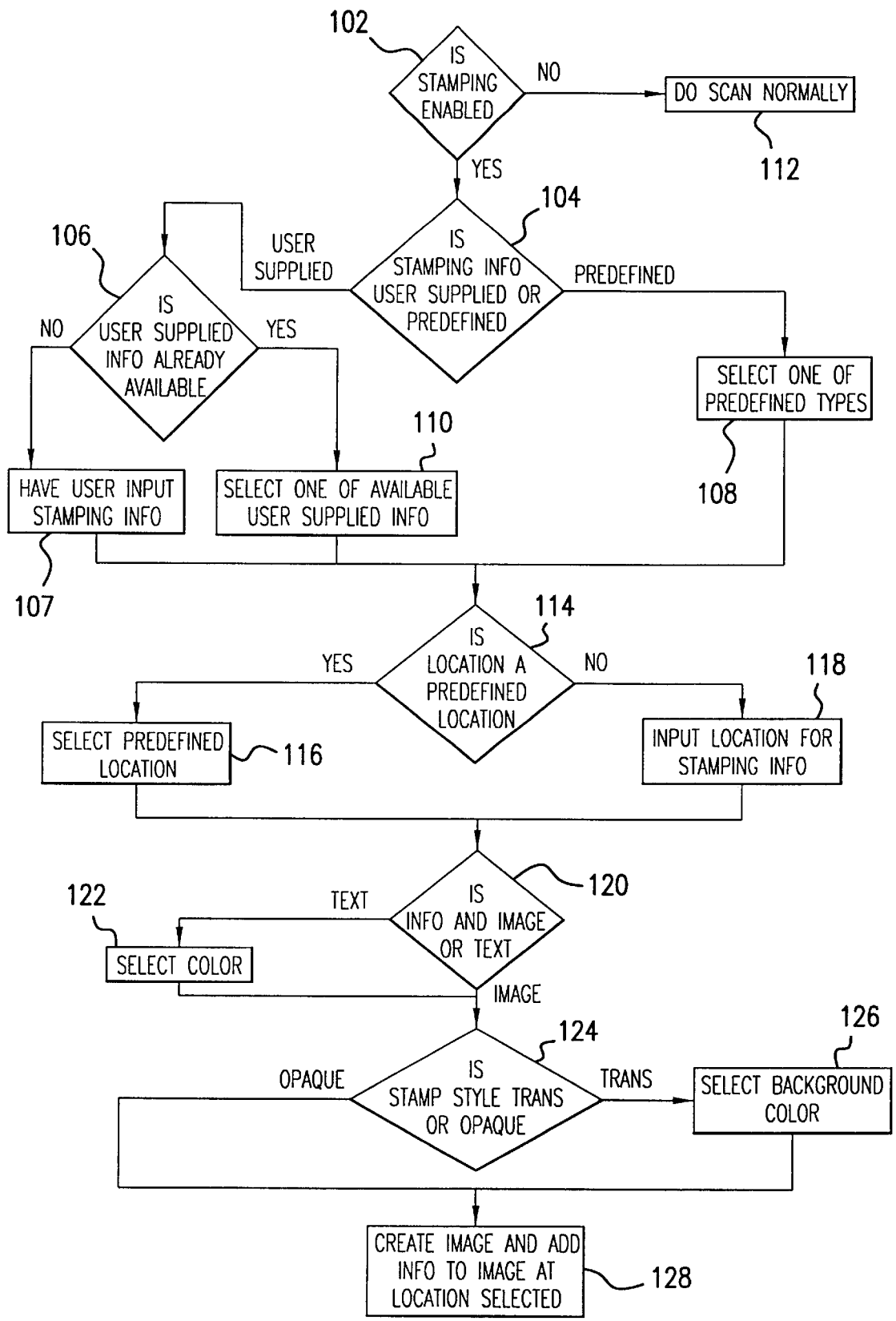
FIG. 1 is a flow chart of the user flow for imputing the stamping information into the scanning system in accordance with the present invention

FIG. 1 shows the user flow for determining the stamping information for a scanning system. When the stamping option is not enabled the scan is done normally 112. When the stamping option is enabled the user is given a choice of using one of the predefined stamps or supplying their own stamping information 104. When the user chooses to use one of the predefined stamps they select which predefined stamp to use from a plurality of predefined stamps 108 (the date of the scan or the scanner ID are two examples of predefined stamps). When the user decides not to use a predefined stamp the user can select a user-supplied stamp currently available or input a new user defined stamp 106. When the user decides to use a currently available user defined stamp the user selects one from a plurality of user defined stamps previously input into the scanning system 110. When a new user defined stamp is required the user inputs the stamping information by typing in the information or selecting a file to be used as the stamp 107. The user then decides between using a predefined location for the stamp or defining the location for the stamp 114. When using a predefined location the user selects from a plurality of predefined locations 116 (for example one of the four corner locations of the image to be scanned). When the user wishes to define an arbitrary stamping location the location is input by the user 118. The user then indicates the type of stamp, either text or a bitmap image 120. When the stamp is text the user selects the color for the text from a plurality of color choices 122 (for example: black, white, blue, green, etc). One of the color choices is the maximum contrast color. The user then indicates which style of stamping to use 124. When the stamping style is transparent (Transparent stamping is where the background color in the stamp does not replace the digital image information) the user selects the background color 126. When the stamping style is opaque (Opaque stamping is where the stamp replaces all the digital image information at the stamping location) the stamping information is sent to the scanner and the scan is started 128.

Figure 2:
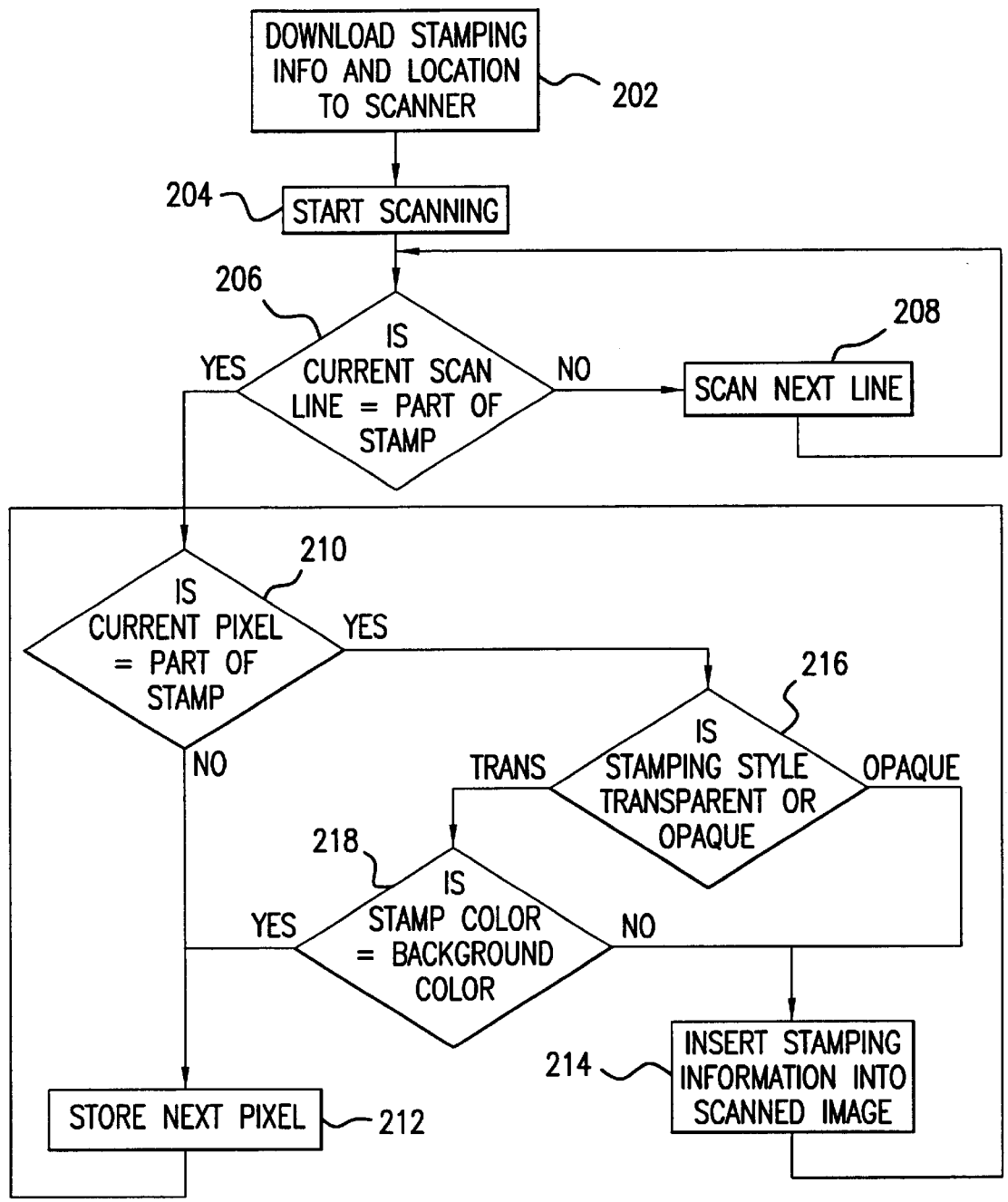
FIG. 2 is a flow chart of the stamping process in the scanning system according to the present invention.

FIG. 2 is a flow chart of the stamping process in the scanning system. Once the scan has been initiated the stamping information and stamping location is downloaded from the host computer to the scanner and saved in the scanner memory 202. The scanner memory is typically one large memory that can be divided into smaller locations used for different tasks. One area can be used for storing downloaded information and one area can be used for buffering the scanning data to be sent to the host computer.

Once the stamping information has been downloaded the scanner then starts scanning the image to be scanned a scan line at a time 204. The current scan line is compared with the y-stamping location 206. When the current scan line is not equal to the y-stamp location the scanner scans the next line 208. When the current scan location is equal to the y-stamp location then the scanner compares the current pixel location to the x-stamp location 210. When the current pixel location is not equal to the x-stamp location the next pixel in the image is stored 212. When the current pixel location is equal to the x-stamping location the stamping information is checked to see if the stamp style is transparent or opaque 216. When the stamping style is opaque the stamping information replaces the digital image 214. When the stamping style is transparent the stamping information for the current pixel is checked to see if the stamping color is equal to the background color. When the stamping color does not equal the background color the stamping information replaces the digital image 214. When the stamping color equals the background color the digital image is unaffected 212. This process continues until the stamp is completely inserted into the digital image. When the scanned image is transferred to the host computer the scanned image contains the stamp information.

The stamping information could be added to the scanned image inside the host computer instead of being downloaded into the scanner. The preferred embodiment is downloading the stamping information into the scanner. One of the advantages of having the scanner insert the stamping information is that the information is already in the scanned image as it leaves the scanner. This can be important if the image is being sent directly to a printer or some other peripheral device.

When the user selects the high contrast color the scanner can determine the high contrast color in two ways. The first way is to select the high contrast color based on the color of the total area where the text will be placed. This results in the text being one color. The second way is to pick a color for each pixel in the text, based on the color of the image where that pixel of text will be placed. This results in text that will have different colors throughout the text unless the image was a constant color where the text was placed. For the area method the average of the red, green, and blue image content of the area where the text will be place is calculated. The high contrast color would be calculated by comparing the average red, green, and blue colors to the midpoint of the allowable range for each color. For example when scanning a 24-bit color image each color has a range from 0 to 255. The midpoint of the range is 128. When the average of the red area is greater that the midpoint of the red range the red component for the text would be set at 0. When the average of the red area is less than the midpoint of the red range the red component for the text would be set at 255. This is repeated for each color until all three color components for the text have been determined. The pixel replacement method uses the same process but it is repeated for each color component at each pixel.

A digital camera is different than a scanner in that a digital camera is typically connected to the host computer only after a number of digital photographs have been created. This requires a digital camera to contain sufficient internal storage to hold a number of digital images. A digital camera typically does not contain a keyboard so it is more cumbersome for a user to enter textual information into a digital camera than into a computer. Digital cameras typically have bi-directional communication channels with host computers such that textual information can be downloaded from the host computer to the digital camera. Because of the cumbersome nature of inputting textual information into a digital camera, the preferred embodiment for the current invention is to have the user input the stamping information into the host computer and then downloading that information into the digital camera. The user would make the same choices for the stamping information, in the host, for the digital camera as they would for the scanner (see FIG. 1). The user would enable or disable the stamping function from the digital camera and select from a plurality of downloaded or predefined stamps contained in the digital camera. When stamping is enabled the digital camera would stamp the information into the digital image in the same way as the scanner (see FIG. 2).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of stamping a digital image with stamping information comprising, the steps:

checking to see if stamping is enabled;

retrieving the stamping information from the user;

digitizing the image information from an object;

automatically selecting a color for the stamping information that maximizes the contrast between the image information and the stamping information;

inserting the stamping information into the digital image.

2. The method of claim 1 where the stamping information is text.

3. The method of claim 1 where the stamping information is a bit map image.

4. A digital imaging system comprising:

a first memory location configured to receive user definable information;

a second memory location configured to receive digitized image information from an object;

a means for digitizing image information from the object;

a processor configured to automatically combine the information from the first memory location with the information from the second memory location;

the processor configured to automatically choose a color for the user definable information that maximizes the contrast between the user definable information and the digitized image information.

5. The digital imaging system of claim 4 where the user definable information is text.

6. The digital imaging system of claim 4 where the user definable information is a bit map image.

* * * * *